United States Patent [19]

Chi et al.

[11] Patent Number: 5,668,305
[45] Date of Patent: Sep. 16, 1997

[54] METHOD AND APPARATUS FOR OVER PRESSURE TESTING PRESSURE SENSITIVE DEVICES ON A WAFER

[75] Inventors: Soon Man Chi; Sungh Kim, both of Seoul, Rep. of Korea

[73] Assignee: Motorola, Inc., Schaumburg, Ill.

[21] Appl. No.: 625,653

[22] Filed: Mar. 29, 1996

[51] Int. Cl.[6] .................................................. G01M 3/02
[52] U.S. Cl. .................................................................. 73/37
[58] Field of Search ............................... 73/12.07, 12.08, 73/4 R, 4 V, 37, 40.7, 865.6

[56] References Cited

U.S. PATENT DOCUMENTS

| | | | |
|---|---|---|---|
| 4,733,553 | 3/1988 | Folk et al. | 73/4 R |
| 4,777,716 | 10/1988 | Folk et al. | 29/593 |
| 4,825,684 | 5/1989 | Nishiguchi et al. | 73/4 R |

Primary Examiner—Michael Brock
Assistant Examiner—Jay L. Politzer
Attorney, Agent, or Firm—Robert Hightower

[57] ABSTRACT

Individual pressure sensitive devices 183 fabricated on a wafer 182 are individually over pressure tested by hermetically securing the wafer 182 between a first plate 105 having individual chambers 135 coupled to an inlet 125 thereon, and second plate 110 having individual chambers coupled to an outlet 130 thereon. A predetermined vacuum generated by a compressor 115 coupled to the first plate 105 is applied to the individual pressure sensitive devices 183 on the wafer 182 for a predetermined duration. Subsequently, a predetermined vacuum generated by a vacuum generator 120 coupled to the outlet 130 is applied to the individual pressure sensitive devices 183 on the wafer 182 to remove disintegrated fragments of the individual pressure sensitive devices 183 on the wafer that fail the over pressure test to minimise contamination.

15 Claims, 3 Drawing Sheets

1

METHOD AND APPARATUS FOR OVER PRESSURE TESTING PRESSURE SENSITIVE DEVICES ON A WAFER

FIELD OF THE INVENTION

The invention relates in general to over pressure testing electronic pressure sensitive devices on a semiconductor wafer, and in particular to over pressure testing individual pressure sensitive devices on a semiconductor wafer.

BACKGROUND OF THE INVENTION

Pressure sensor IC's are used in medical equipment such as in automatic high blood pressure meters. Consequently, pressure sensor ICs must meet stringent pressure test parameters, and the contamination to which pressure sensor ICs are exposed during manufacture must be strictly maintained.

An important test during the manufacture of pressure sensor ICs is a destructive over pressure test. In a conventional over pressure test, a pressure sensor IC, which has been singulated from a semiconductor wafer, and mounted and wire bonded to a substrate, is placed in a pressure chamber. The pressure in the pressure chamber is increased to an extreme pressure and maintained for a predetermined duration. If the pressure sensor IC remains intact for the predetermined, duration, the pressure sensor IC under test passes the over pressure test. Otherwise, the pressure sensor IC under test disintegrates and disperses fragments of the disintegrated pressure sensor IC within the test chamber, thus failing the over pressure test. A disadvantage of this method is, each pressure sensor IC must be singulated from a semiconductor wafer, and mounted and wire bonded to a substrate, before over it can be over pressure tested. Consequently, when a unit fails the over pressure test, the time, materials and equipment utilisation that were used in the singulating, mounting and wire bonding processes are wasted.

Hence, there is a need for a method and an apparatus for over pressure testing pressure sensor ICs prior to singulation from a semiconductor wafer.

SUMMARY OF THE INVENTION

In carrying out the objects of the present invention in one form, there is provided a method for over pressure testing individual pressure sensitive devices on a wafer, the method comprising the steps of: locating the wafer in a predetermined location between a first plate having an inlet and a second plate having an outlet; applying a predetermined pressure to the individual pressure sensitive devices on the wafer via the inlet of the first plate; applying a predetermined vacuum to the individual pressure sensitive devices on the wafer via the outlet of the second plate; and removing the wafer from the predetermined location between the first plate and the second plate.

In carrying out the objects of the present invention in another form, there is provided an apparatus for over pressure testing individual pressure sensitive devices on a wafer, the apparatus comprising: a first plate having individual chambers coupled to an inlet thereon, wherein the inlet is coupled to a compressor for applying a predetermined pressure via the individual chambers on the individual pressure sensitive devices on the wafer; and a second plate having individual chambers coupled to an outlet thereon, wherein the outlet is coupled to a vacuum generator for applying a predetermined vacuum via the individual chambers on the individual pressure sensitive devices on the wafer.

DETAILED DESCRIPTION OF THE INVENTION

Figure 1:
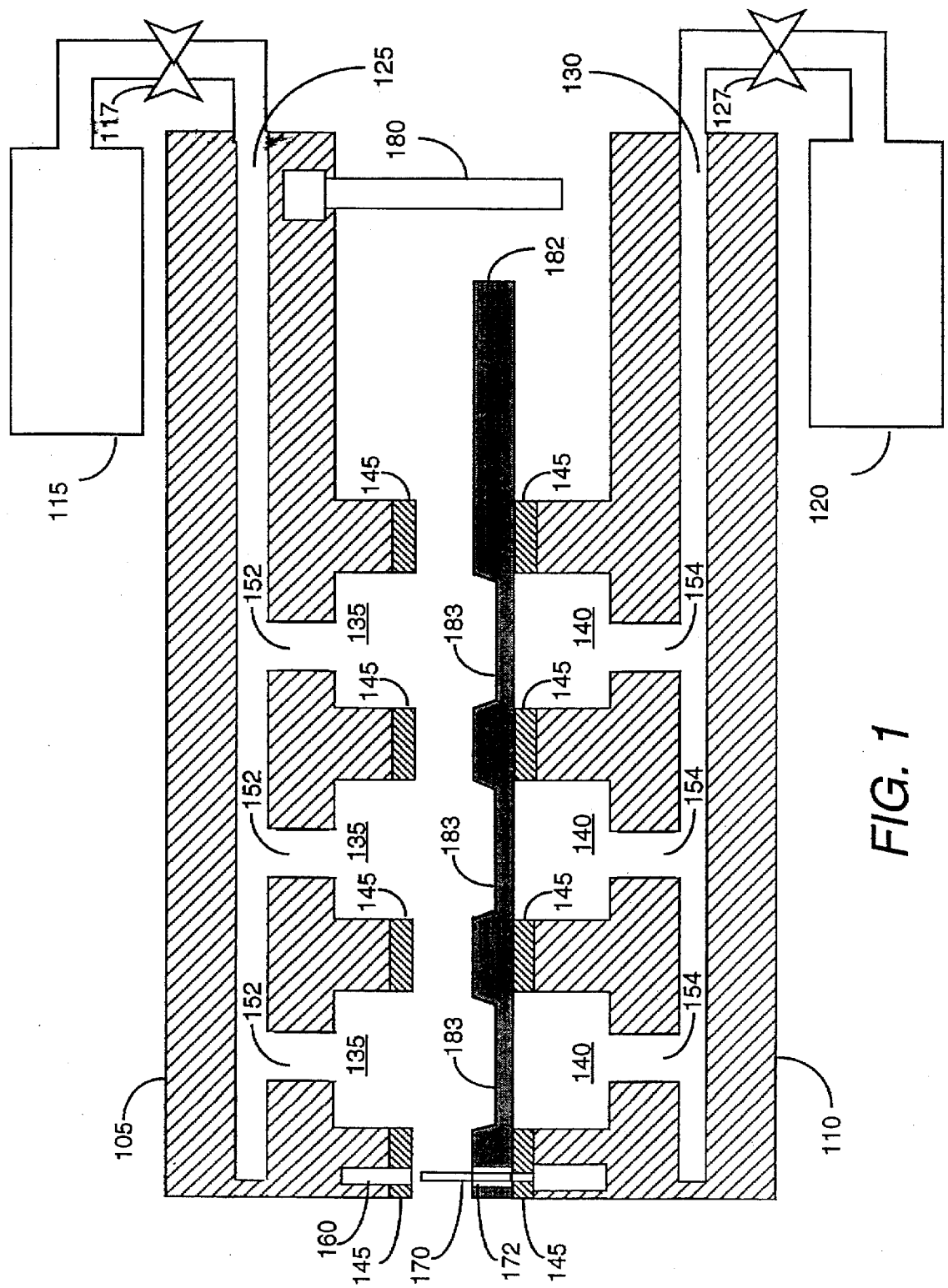
FIG. 1 illustrates a side sectional view of an apparatus for over pressure testing individual pressure sensitive devices on a wafer in accordance with the preferred embodiment of the present invention.

FIG. 1 illustrates a first plate 105 having an inlet 125 coupled to a compressor 115 via a first valve 117, a second plate 110 having an outlet 130 coupled to a vacuum generator 120 via a second valve 127, and a wafer 182 located in a predetermined location between the first plate 105 and the second plate 110. The wafer 182 has a number of individual pressure sensitive devices 183 fabricated thereon. The pressure sensitive devices 183 can be electronic pressure sensors, or electronic devices that will be used in extreme pressure or vacuum environments. In the preferred embodiment, the wafer 182 comprises a semiconductor wafer on which a number of individual electronic pressure sensor devices are fabricated. The compressor 115 can comprise a pneumatic compressor, a compressor that compresses an inert gas, or a fluid compressor, and is capable of generating the predetermined pressure. The compressor 115 that is used is dependent on the type of pressure sensitive devices 183 on the wafer 182 for over pressure testing, and the predetermined pressure to be generated. The predetermined pressure is the pressure at which the pressure sensitive devices 183 on the wafer 182 are to be over pressure tested. In the preferred embodiment, the predetermined pressure is 930.15 kilopascal (KPa). The vacuum generator 120 comprises an equipment, such as is known in the art, capable of generating a vacuum having a magnitude that is the equivalent of the inverse of the predetermined pressure. The first valve 117 couples the compressor 182 to the inlet 125 to apply the predetermined pressure on the individual pressure sensitive devices 183, and de-couples the compressor 182 from the inlet 125 to relieve the predetermined pressure applied on the individual pressure sensitive devices 183 on the wafer 182. Similarly, the second valve 127 couples the vacuum generator 120 to the outlet 130 to apply the predetermined vacuum to the individual pressure sensitive devices 183 on the wafer 182, and de-couples the vacuum generator 120 from the outlet 130 to relieve the predetermined vacuum applied on the individual pressure sensitive devices 183 on the wafer 182.

On the first plate 105 are individual chambers 135, each coupled via individual pathways 152 to the inlet 125. On the second plate 110, are individual chambers 140, each coupled via individual pathways 154 to the outlet 130. Both, the first and second plates 105 and 110 include a hermetic sealing layer 145 for hermetically sealing the individual pressure sensitive devices 183 on the wafer 182 in the predetermined location between the individual chambers 135 and 140 on the first and second plates 105 and 110, respectively.

An alignment pin 170 on the second plate 110 mates with an alignment hole 160 on the first plate 105 to align the individual chambers 135 on the first plate 105 with the individual chambers 140 on the second plate 110 when the first and second plates 105 and 110 come together. The alignment pin 170 also aligns the wafer 182 to locate the wafer 182 in the predetermined location between the first and second plates 105 and 110. This is accomplished by having an alignment hole 172 on the wafer 182 that mates with the alignment pin 170 on the second plate 110 to align the individual chambers 135 on the first plate 105 and the individual chambers 145 on the second plate 110 with the individual pressure sensitive devices 183 on the wafer 182, thus locating the wafer 182 in the predetermined location between the first and second plates 105 and 110. In one embodiment more than one set of alignment pins on the first plate and alignment holes on the second plate are used to ensure alignment between the individual chambers, the individual chambers and the individual pressure sensitive devices, consequently the wafer also has the corresponding number of alignment holes to mate with the alignment pins.

In addition, a protrusion 180 from the first plate 105 limits the proximity between the first plate 105 to the second plate 110 to prevent excessive pressure between the first and second plates 105 and 110 damaging the wafer therebetween. In one embodiment, more than one protrusion is used, and in another embodiment the protrusion 180 may be mounted on the second plate 110 and effectively perform the same function.

Figure 2:
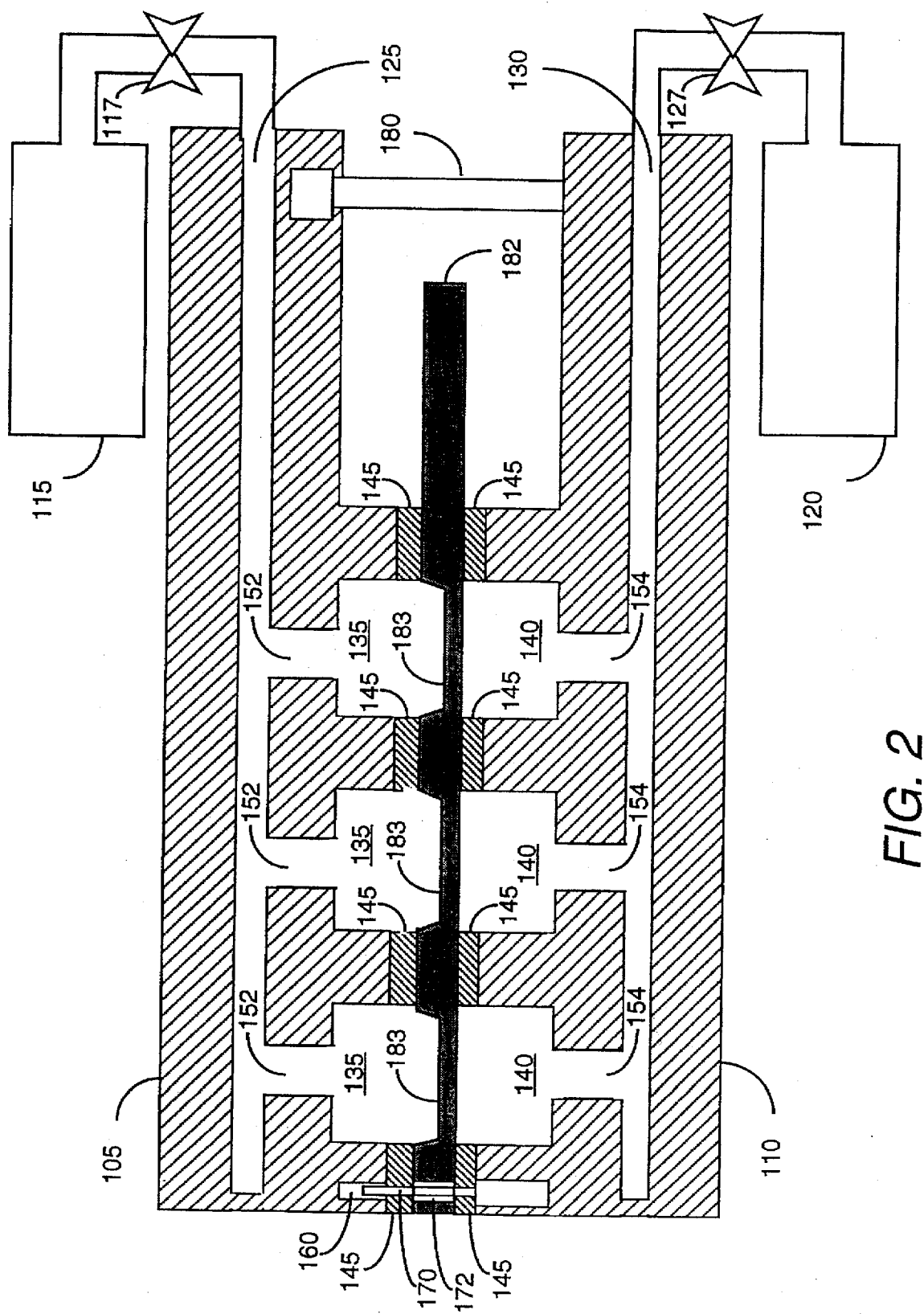
FIG. 2 illustrates a side sectional view of the apparatus in FIG. 1 for over pressure testing the individual pressure sensitive devices on the wafer in accordance with the preferred embodiment of the present invention.

FIG. 2 illustrates the individual pressure sensitive devices 183 on the wafer 182 hermetically sealed between the individual chambers 135 on the first plate 105 and the individual chambers 140 on the second plate 110. The individual chambers 135 on the first plate 105 confines the predetermined pressure from the compressor 115 to a first side of the individual pressure sensitive devices 183 on the wafer 182, and the individual chambers 140 on the second plate 110 confines the predetermined vacuum from the vacuum generator 120 to a second side of the individual pressure sensitive devices 183 on the wafer 182.

Figure 3:
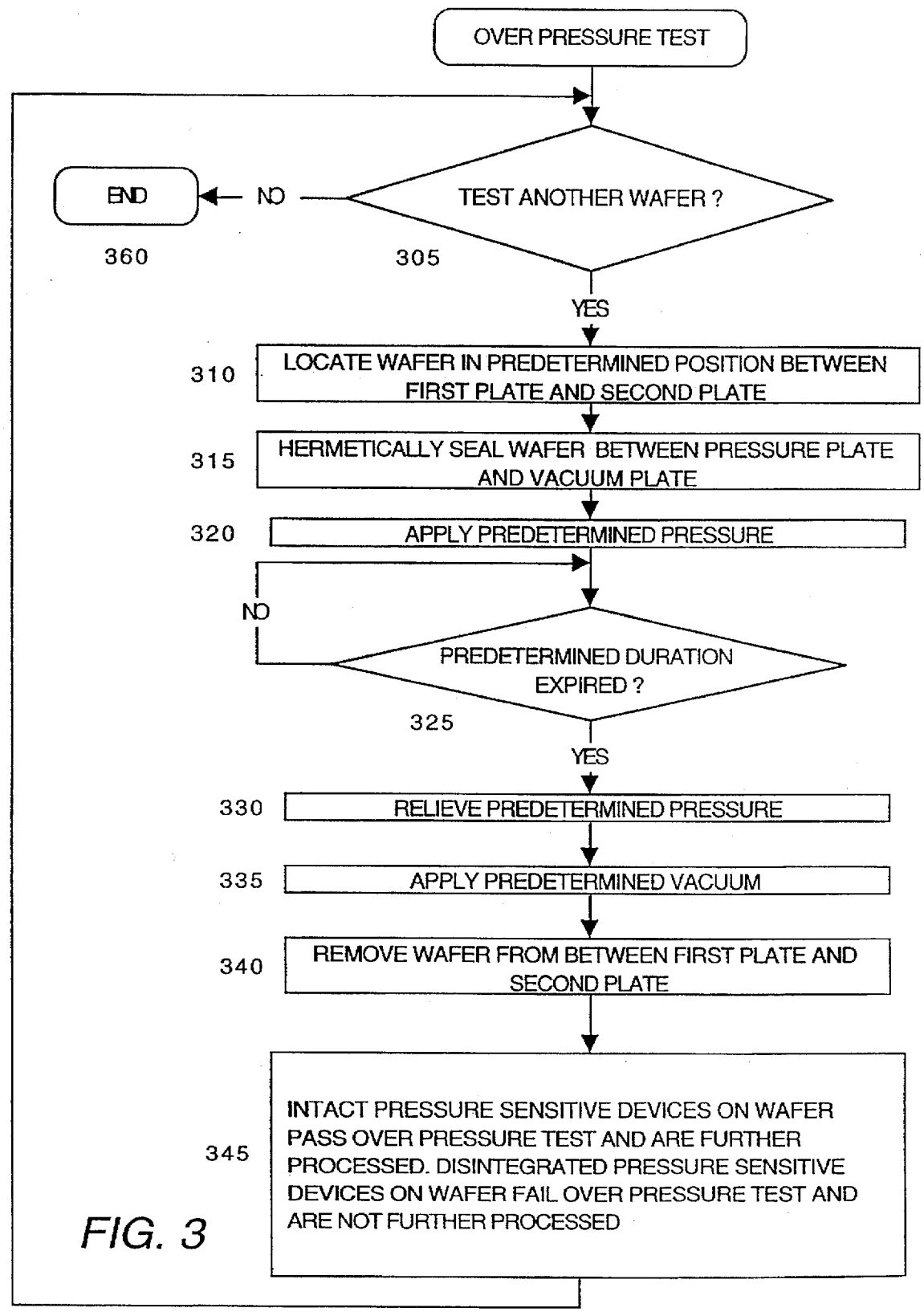
FIG. 3 illustrates a flow chart detailing a method for over pressure testing the individual pressure sensitive devices on the wafer in accordance with the preferred embodiment of the present invention.

FIG. 3 illustrates a flowchart detailing a method for over pressure testing the individual pressure sensitive devices 183 on the wafer 182. With reference to FIGS. 1,2 and 3, when the wafer 182 is to be over pressure tested 305, the wafer 182 is located 310 in the predetermined location between the first and second plate 105 and 110. The first and second plates 105 and 110 are then brought together to hermetically seal 315 the wafer 182 therebetween, and the predetermined pressure is applied 320 to the individual pressure sensitive devices 183 on the wafer 182 by operating the first valve 117 to couple the inlet 125 to the compressor 115. After a predetermined duration has expired 325, the predetermined pressure on the individual pressure sensitive devices 183 on the wafer 182, is relieved 330 by operating the first valve 117 to de-couple the compressor 115 from the inlet 125. The predetermined duration is the duration during which the individual pressure sensitive devices 183 on the wafer 182 are exposed to the predetermined pressure, and can be determined by correlation with the reliability of the pressure sensitive devices 183 in the field. Pressure sensitive devices 183 on the wafer 182 that remain intact after the predetermined duration pass the over pressure test, however, pressure sensitive devices 183 on the wafer 182 that fail the over pressure test disintegrate into fragments. The fragments of the failed pressure sensitive devices 183 on the wafer 182 contaminate the individual chambers 135 and 140 on the first plate and second plate respectively. Subsequently, the predetermined vacuum generated by the vacuum generator 120 is applied 335 to the pressure sensitive devices 183 on the wafer 182 by operating the second valve 127 to couple the vacuum generator 120 to the outlet 130. The predetermined vacuum is applied 335 for a duration and with a magnitude which is sufficient to clear the disintegrated fragments of failed pressure sensitive devices 186 on the wafer 182, efficiently. The duration and magnitude of the predetermined vacuum is dependent upon such considerations as the predetermined pressure used in the over pressure test, the dimensions of the pressure sensitive devices, and the degree of contamination that is tolerable on over pressure tested pressure sensitive devices. Subsequently, the wafer 182 having the over pressure tested pressure sensitive devices 183 thereon is removed from the predetermined location between the first and second plates 105 and 110. Over pressure tested pressure sensitive devices 183 on the wafer 182 that are intact are further processed, while the over pressure tested pressure sensitive devices 183 on the wafer that are disintegrated are not. In the preferred embodiment, the pressure sensitive devices are fabricated on individual die on a semiconductor wafer. Consequently, only die that pass the over pressure test are taken from the wafer and packaged while the die that fail the over pressure test are not further process. When another wafer of pressure sensitive devices is to be over pressure tested, the steps as described above are repeated, however, when there are no further wafers to be over pressure tested, the process ends 360.

Part of a conventional semiconductor device packaging process includes wafer sawing where the die on a wafer are singulated; and die bonding where singulated die are picked and placed on individual substrates. In a conventional automated die bonding process, the sawn wafer is mounted on a blue sheet and mounted a conventional automated die bonding equipment. In such equipment, individual die on the mounted wafer are picked and placed on individual substrates, however, individual die are checked for a blue marking prior to picking. The blue marking indicates that a die is defective and a blue marked die will not be picked. With the present invention, a die having a pressure sensitive device thereon that fails the over pressure test would be advantageously detected in conventional automatic die bonding equipment because light colored blue, coming through the blue sheet and through the opening in the wafer left by a failed disintegrated pressure sensitive device, is detected by the automatic die bonding equipment and is not picked. Hence, no additional inspection nor testing need be executed on an over pressure tested wafer allowing an over pressure tested wafer to be processed by conventional automatic die bonding equipment immediately after the over pressure test.

In accordance with the present invention individual pressure sensitive devices on a wafer can be individually over pressure tested. This is achieved by hermetically sealing the wafer between a first plate having individual chambers coupled to a compressor via an inlet, and a second plate having individual chambers coupled to a vacuum generator via an outlet. The wafer is located in a predetermined location between the first and second plate such that the individual pressure sensitive devices on the wafer are aligned with the individual chambers on the first and second plates. A predetermined pressure generated by the compressor is applied to the individual pressure sensitive devices on the wafer for a predetermined duration, after which a predetermined vacuum generated by the vacuum generator is applied to the individual pressure sensitive devices on the wafer. The pressure sensitive devices that remain intact after the predetermined pressure is applied for the predetermined duration pass the over pressure test. However, the pressure sensitive devices that fail the over pressure test disintegrate into fragments which are subsequently removed by the predetermined vacuum. An advantage of the present invention is pressure sensitive devices can be over pressure tested on the wafer while minimising contamination of the pressure sensitive devices on the wafer. Another advantage of the present invention is the cost savings of not processing a pressure sensitive die prior to testing as in the prior art. Yet another advantage of the present invention is the ability to process a wafer of over pressure tested pressure sensitive devices on conventional die bonding equipment, and the additional advantage of having the conventional die bonding equipment determine which of the pressure sensitive devices on the wafer are intact, and picking only the pressure sensitive devices on the wafer that are intact for die bonding.

Hence, the present invention provides a method and an apparatus for economically over pressure testing pressure sensor ICs prior to singulation from a semiconductor wafer, and minimising contamination of the pressure sensor ICs on the wafer caused by the over pressure test.

We claim:

1. An apparatus for over pressure testing individual pressure sensitive devices on a wafer, the apparatus comprising:

a first plate having individual chambers coupled to an inlet thereon, wherein the inlet is coupled to a compressor for applying a predetermined pressure via the individual chambers on the individual pressure sensitive devices on the wafer; and a second plate having individual chambers coupled to an outlet thereon, wherein the outlet is coupled to a vacuum generator for applying a predetermined vacuum via the individual chambers on the individual pressure sensitive devices on the wafer.

2. The apparatus in claim 1 wherein the first plate includes at least one alignment hole thereon, and wherein the second plate includes at least one alignment pin thereon for mating with the at least one alignment hole on the first plate to substantially align the individual chambers on the first plate and the individual chambers on the second plate.

3. The apparatus in claim 1 wherein the first plate includes at least one protrusion therefrom for limiting the proximity between the first plate to the second plate, when hermetically sealing the wafer therebetween.

4. The apparatus of claim 1 wherein a first valve is coupled between the inlet and the compressor for coupling the compressor to the inlet to apply the predetermined pressure on the individual pressure sensitive devices on the wafer, and for de-coupling the compressor from the inlet to relieve the predetermined pressure applied on the individual pressure sensitive devices on the wafer.

5. The apparatus of claim 1 wherein a second valve is coupled between the outlet and the vacuum generator for coupling the vacuum generator to the outlet to apply the predetermined vacuum on the individual pressure sensitive devices on the wafer, and for de-coupling the vacuum generator from the outlet to relieve the predetermined vacuum applied on the individual pressure sensitive devices on the wafer.

6. The apparatus of claim 1 wherein the individual chambers on the first plate are coupled to the inlet via individual pathways.

7. The apparatus of claim 6 wherein the first plate includes a hermetic sealing layer for forming a hermetic seal between the individual pressure sensitive devices on the wafer and the individual chambers on the first plate.

8. The apparatus of claim 1 wherein the individual chambers on the second plate are coupled to the outlet via individual pathways.

9. The apparatus of claim 8 where in the second plate includes a hermetic sealing layer for forming a hermetic seal between the individual pressure sensitive devices on the wafer and the individual chambers on the second plate.

10. The apparatus of claim 1 wherein the individual chambers on the first plate and the individual chambers on the second plate are substantially aligned with the individual pressure sensitive devices on the wafer.

11. The apparatus in claim 10 wherein the individual chambers on the first plate confine the predetermined pressure to a first side of the individual pressure sensitive devices on the wafer, and wherein the individual chambers on the second plate confine the predetermined vacuum to a second side of the individual pressure sensitive devices on the wafer.

12. An apparatus for over pressure testing individual pressure sensitive devices on a wafer, the apparatus comprising:

a plate having individual chambers coupled to an outlet thereon, wherein the plate includes an aligning means for aligning the wafer in a predetermined location on the plate to substantially align the individual pressure sensitive devices on the wafer with the individual chambers on the plate, and wherein the outlet is coupled to a vacuum generator for applying a predetermined vacuum on the individual pressure sensitive devices on the wafer for a predetermined duration, and when some of the individual pressure sensitive devices on the wafer disintegrate into fragments, the predetermined vacuum removing the disintegrated fragments from the plate to prevent contamination of the plate therewith.

13. The apparatus of claim 12 wherein the individual chambers are coupled to the outlet via individual pathways.

14. An apparatus for over pressure testing individual pressure sensitive devices on a wafer, the apparatus comprising:

a plate having individual chambers coupled to an inlet thereon, wherein the plate includes an aligning means for aligning the wafer in a predetermined location on the plate to substantially align the individual pressure sensitive devices on the wafer with the individual chambers on the plate, and wherein the inlet is coupled to a compressor for applying a predetermined pressure on the individual pressure sensitive devices on the wafer for a predetermined duration, and when some of the individual pressure sensitive devices on the wafer disintegrate into fragments, the predetermined pressure ejecting the disintegrated fragments from the plate to prevent contamination of the plate therewith.

15. The apparatus of claim 14 wherein the individual chambers are coupled to the outlet via individual pathways.

* * * * *